United States Patent

Berwin et al.

[15] 3,643,106
[45] Feb. 15, 1972

[54] ANALOG SHIFT REGISTER

[72] Inventors: Ted W. Berwin; John A. Rado, both of Los Angeles, Calif.

[73] Assignee: Hughes Aircraft Company, Culver City, Calif.

[22] Filed: Sept. 14, 1970

[21] Appl. No.: 71,705

[52] U.S. Cl. ..........................307/221 C, 307/222, 307/238, 307/251, 340/173
[51] Int. Cl. .......................................................H03k 17/60
[58] Field of Search ..............307/205, 221, 221 C, 222, 238, 307/251, 279, 304; 328/37, 44; 340/173

[56] References Cited

UNITED STATES PATENTS

| | | | |
|---|---|---|---|
| 3,248,562 | 4/1966 | Felcheck | 307/222 X |
| 3,454,785 | 7/1969 | Norman et al. | 307/238 X |
| 3,518,451 | 6/1970 | Booher | 307/205 X |
| 3,524,077 | 8/1970 | Kaufman | 307/221 C X |
| 3,478,323 | 11/1969 | Rado | 307/238 X |

Primary Examiner—Stanley T. Krawczewicz
Attorney—James K. Haskell and Bernard P. Drachlis

[57] ABSTRACT

An analog shift register capable of storing and shifting sampled analog data as well as digital data. An embodiment of the analog shift register has four components, two capacitors, and two transistors per stage. Information is stored as the absence of a quantity of electric charge. The electric charge is proportional to the sampled value of the input signal according to the equation $q=Cv$. The shifting is accomplished by the transfer of electric charge from one capacitor to the next.

7 Claims, 9 Drawing Figures

| MODE | STEP | S | G1 | G2 | K1 | K2 | V1 | V2 | V3 | V4 | V5 | V6 |
|---|---|---|---|---|---|---|---|---|---|---|---|---|
| INITIAL COND. | — | OPEN | L | L | L | L | H | H | H | H | H | H |
| HOLD 1 | — | OPEN | L | L | H | L | 2H | H | 2H | H | 2H | H |
| HOLD 2 | — | OPEN | L | L | L | H | H | 2H | H | 2H | H | 2H |
| HOLD 3 | — | OPEN | L | L | H | H | 2H | 2H | 2H | 2H | 2H | 2H |
| INFORMATION SHIFT-RIGHT | 1 | CLOSED | L | H | H | L | $2H - g_1/c_1$ | H | 2H | H | 2H | H |
| (CHARGES - SHIFT LEFT) | 2 | OPEN | H | L | L | H | H | $2H - g_1/c_2$ | H | 2H | H | 2H |
| | 3 | CLOSED | L | H | L | L | $2H - g_2/c_1$ | H | $2H - g_1/c_3$ | H | 2H | H |
| | 4 | OPEN | L | H | H | H | H | $2H - g_2/c_2$ | H | $2H - g_1/c_4$ | H | 2H |
| | 5 | CLOSED | L | H | L | L | $2H - g_3/c_1$ | H | $2H - g_2/c_3$ | H | $2H - g_1/c_5$ | H |
| | 6 | OPEN | H | L | L | H | H | $2H - g_3/c_2$ | H | $2H - g_2/c_4$ | H | $2H - g_1/c_6$ |

FIG. 2

| | G1 | G2 | K1 | K2 | MODE |
|---|---|---|---|---|---|
| 1 | 0 | 0 | 0 | 0 | HOLD |
| 2 | 0 | 0 | 0 | 1 | " |
| 3 | 0 | 0 | 1 | 0 | " |
| 4 | 0 | 0 | 1 | 1 | " |
| 5 | 0 | 1 | 0 | 0 | CHARGES INTERMIX |
| 6 | 0 | 1 | 0 | 1 | $q_C$ EVEN → $q_C$ ODD CHARGES SHIFT RIGHT |
| 7 | 0 | 1 | 1 | 0 | $q_C$ EVEN ← $q_C$ ODD CHARGES SHIFT LEFT |
| 8 | 0 | 1 | 1 | 1 | HOLD |
| 9 | 1 | 0 | 0 | 0 | CHARGES INTERMIX |
| 10 | 1 | 0 | 0 | 1 | $q_C$ ODD ← $q_C$ EVEN CHARGES SHIFT LEFT |
| 11 | 1 | 0 | 1 | 0 | $q_C$ ODD → $q_C$ EVEN CHARGES SHIFT RIGHT |
| 12 | 1 | 0 | 1 | 1 | HOLD |
| 13 | 1 | 1 | 0 | 0 | RESET TO FIXED VOLTAGE ON ALL CAPACITORS |
| 14 | 1 | 1 | 0 | 1 | RESET TO FIXED VOLTAGE ON ALTERNATE CAPACITORS |
| 15 | 1 | 1 | 1 | 0 | RESET TO FIXED VOLTAGE ON ALTERNATE CAPACITORS |
| 16 | 1 | 1 | 1 | 1 | RESET TO FIXED VOLTAGE ON ALL CAPACITORS |

FIG. 4.

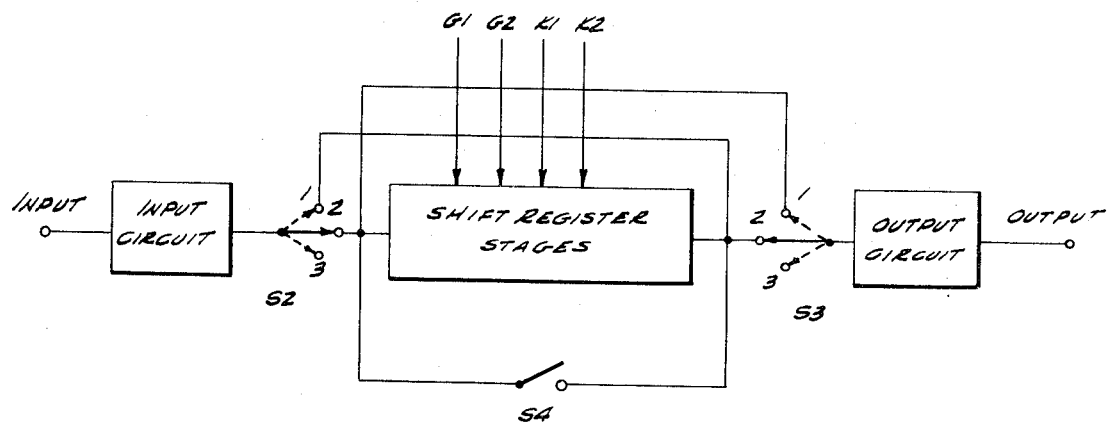

FIG. 5.

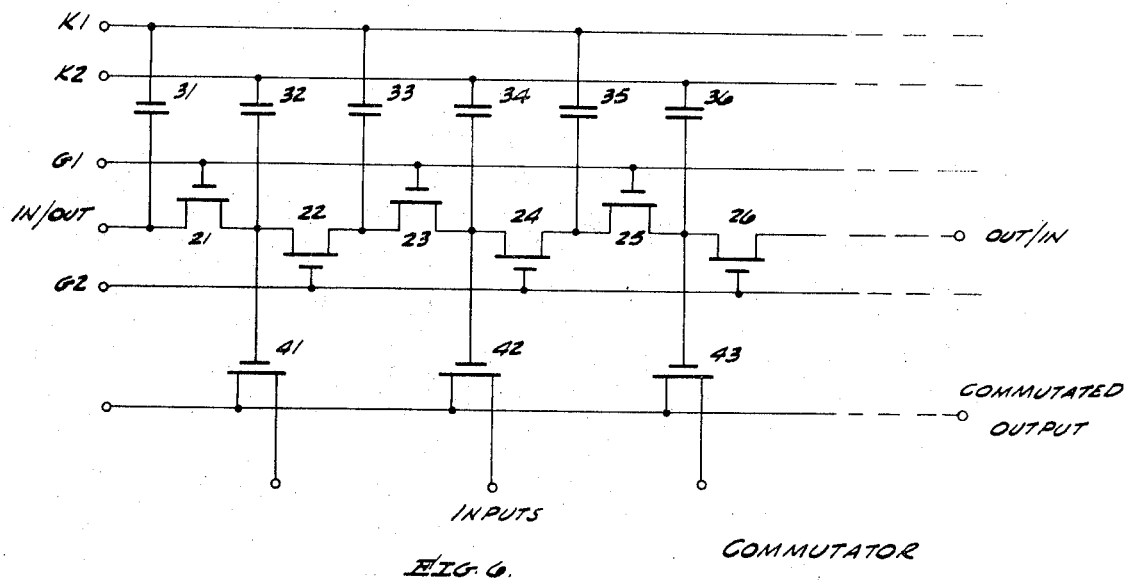
FIG. 6.    COMMUTATOR
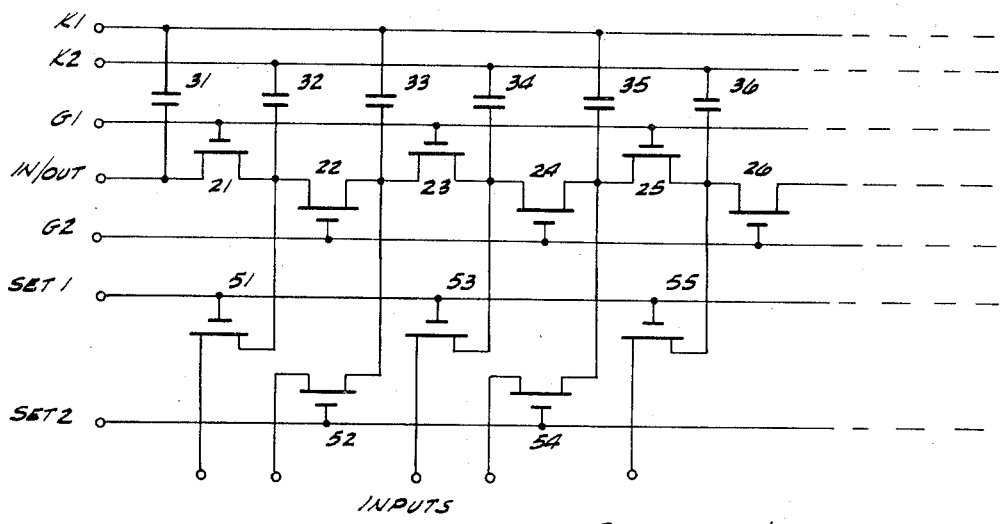
FIG. 7.    PARALLEL INPUT – SERIAL OUTPUT

LEFT-RIGHT/UP-DOWN
SHIFT REGISTER

SIGNAL AVERAGING

ANALOG SHIFT REGISTER

BACKGROUND OF THE INVENTION

The analog shift register has many uses, among which are as a solid-state scan converter, a signal processor for doppler and synthetic array radar; auto and cross-correlation, intermediate video storage and delay, variable audio time delay to provide reverberation effect, and analog field problem simulation of Laplace wave and beam equations.

The use of capacitor circuits as analog signal delay lines have been proposed in the past. One article describing this type of circuit has been published in the magazine Nature, Jan. 26, 1952, pages 148-149 entitled "Discontinuous Low-Frequency Delay Line with Continuously Variable Delay," by J. M. L. Janssen. Another article describing this type of circuit has been published in IEEE Transactions on Military Electronics, July–Oct. 1965, pages 246 to 254, entitled "Automatic Correction of Timing Errors in Magnetic Tape Recorders," by W. J. Hannon, et al. Both of these articles describe circuits wherein the signal to be delayed is sampled and stored in a cascade of capacitors interconnected by switches operated at the same frequency as the signal sampler. This type of delay line never came into general use because of the complicated switches required.

Another type of circuit has been recently proposed where the signal transfer is established by a charge transfer in the direction opposite the signal travel. This has been described in the IEEE Journal of Solid-State Circuits, vol. SC-4, No. 3, June 1969, pages 131–136 in an article entitled "Bucket-Brigade Electronics—New Possibilities for Delay, Time-Axis Conversion, and Scanning" by F. L. J. Sangster, et al. Another article describing this circuit is in the Digest of Technical Papers of the 1970 IEEE International Solid-State Circuits Conference, pages 74, 75, and 185 in an article entitled "Integrated MOS and Bipolar Analog Delay Lines using Bucket-brigade Capacitor Storage" by F. L. J. Sangster.

SUMMARY OF THE INVENTION

The analog shift register of the present invention operates on the principle of electric charge transfer. Each stage of the shift register is constructed from two transistors and two storage capacitors. The capacitors are used to store electric charge. The transistors are used to control the transfer of electric charge from one capacitor to the next. The input circuit to the shift register converts a sampled analog signal to a quantized electric charge $q$ according to the equation $q=Cv$. The charge $q$ is then shifted through the analog shift register under control of clock pulse signals.

The analog shift register also has application in digital circuits due to the fewer number of components per stage of shift register. The analog shift register is well suited for construction by monolithic semiconductor techniques as well as fabrication in large scale integration arrays

DESCRIPTION OF THE DRAWINGS

FIG. 2 is a table showing the detailed operation of the circuit of FIG. 1.

FIG. 4 is a table showing operation of the analog shift register with various combinations of input signals.

FIG. 5 is a block diagram of input and output circuit switching to enable shifting in either direction.

FIG. 6 shows an analog shift register used as a commutator.

FIG. 7 shows an analog shift register used as a parallel input-serial output circuit.

DESCRIPTION OF THE PREFERRED EMBODIMENTS

The invention is based on the principle of the transfer of electric charge from one capacitor to another under control of a transistor. The basic relationship is that charge $q$ is equal to the capacitance $C$ times the voltage on the capacitor $v$. Thus, charge on the capacitor is proportional to its voltage.

The invention will be explained with the use of field effect transistors and more particularly junction field effect transistors. A field effect transistor has a source S, a drain D and a gate G. It should be noted that the source and drain of a field effect transistor are interchangeable and may be referred to herein as the signal terminals of the transistor. Further, the gate is the control terminal which controls conductance between the source and drain terminals. The field effect transistor has a pinchoff voltage which is the gate to source voltage required for onset or pinchoff of transistor conduction. For example, the pinchoff voltage for typical field effect transistor is 2 volts. This means that the transistor will stop conducting whenever the source of the transistor is 2 volts more positive than the gate of the transistor.

Figure 1:
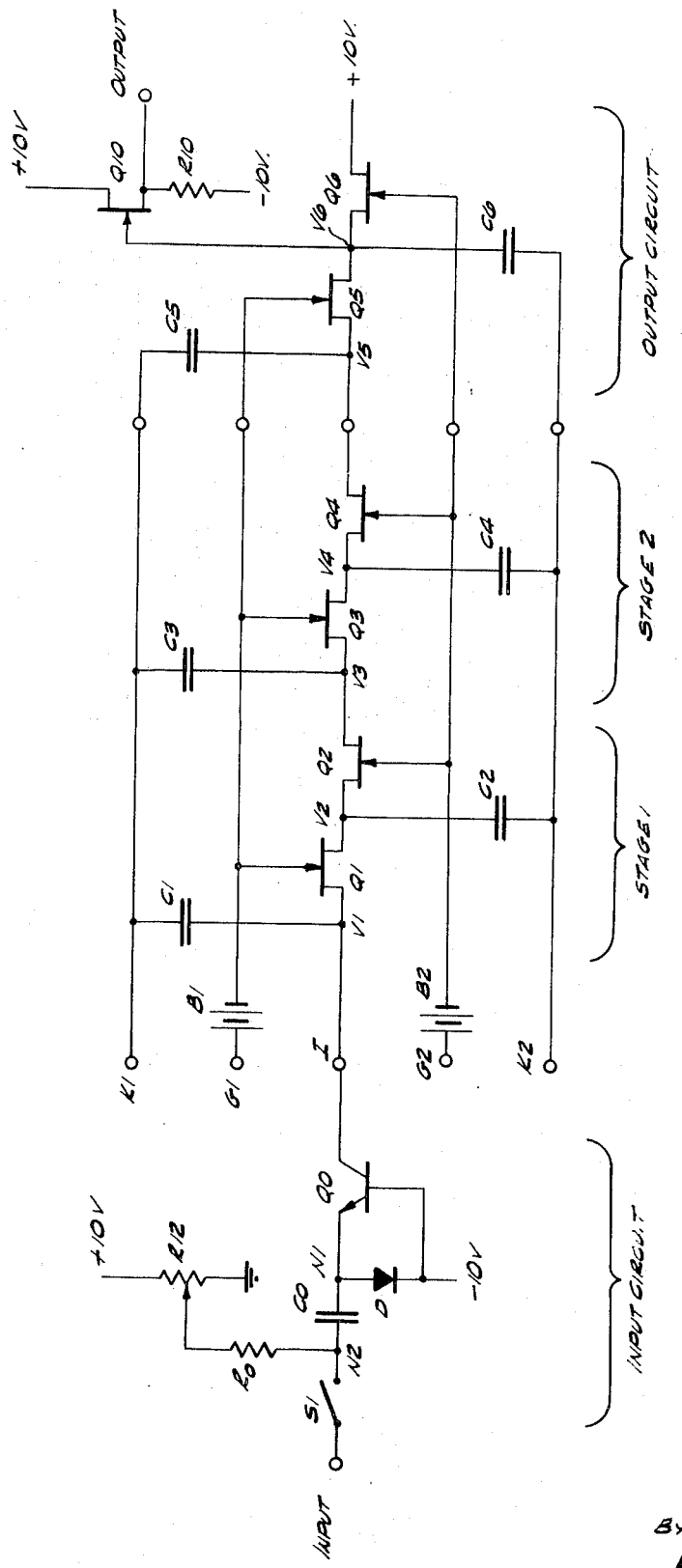
FIG. 1 shows a preferred embodiment of a multilevel shift register of the present invention.

Referring now to FIG. 1, there is shown a preferred embodiment of the analog shift register. The complete shift register as shown in FIG. 1 includes an input circuit to convert a time-varying analog input signal to a succession of electric charge samples, two identical stages of the analog shift register, and an output circuit to reconvert the electric charges to an analog output signal. Each shift register stage includes two capacitors and two transistors. For example, Stage 1 as shown in FIG. 1 includes a capacitor C1, a transistor Q1, a capacitor C2 and a transistor Q2. The capacitor C1 has one terminal connected to a clock pulse input K1. The other terminal is connected to a signal input I. The transistor Q1 has its gate terminal connected to a clock pulse input G1 through a battery B1. The battery B1 provides an offset voltage to compensate for the pinchoff voltage of the transistor. The source of the transistor Q1 is connected to the input terminal I. The drain of the transistor Q1 is connected to the source of a transistor Q2. The drain of the transistor Q1 is further connected to one terminal of the capacitor C2. The other terminal of the capacitor C2 is connected to a clock pulse input K2. The gate of the transistor Q2 is connected to a clock pulse input G2 through a battery B2. The battery B2 provides an offset voltage to compensate for the pinchoff voltage of the transistor. The drain of the transistor Q2 is connected to the next stage of the shift register. The next stage of the shift register is identical to Stage 1. Stage 2 includes a capacitor C3, a transistor Q3, a capacitor C4 and a transistor Q4, is interconnected in a manner identical to Stage 1. Additional identical stages may be connected between Stage 2 and the output circuit. The actual number of stages in any particular shift register will depend upon the requirements for its use.

The detailed operation of the shift register stages will now be explained with reference to FIG. 1 and the table of FIG. 2. The input circuit will operate to provide a charge $qi$ where $i$ is an integer, which will be proportional to the analog input signal whenever the switch S1 is closed. The detailed operation of the input circuit will be explained later. The output circuit provides the necessary termination voltages for operation of the shift register and provides a means for reconverting the charge in the shift register to an analog output voltage signal. The detailed operation of the output circuit will be explained later. Voltage levels will be applied to input terminals K1, K2, G1 and G2. These levels may be indicated generally as a high level H, or a low level L. The actual voltages involved will depend upon the details of the circuitry. For example, the high level may be +5 volts and the low level may be 0 volts. Initially, assume that all inputs G1, G2, K1 and K2 are at the low level L. Assume further that each capacitor C1 through C6 has an initial voltage equal to the high level H which will induce an equivalent electric charge on the capacitor. How this initial voltage is obtained will be explained in detail later. This is shown as the initial condition mode in FIG. 2. Since switch S1 is open, no input is applied to the circuit.

As noted above, the batteries B1 and B2 provide offset voltages to compensate for the pinchoff voltage of the transistors. Throughout the remainder of the description of the invention, the effect of the pinchoff voltage will be ignored, unless otherwise indicated. Thus, in the following description, a transistor will conduct when the gate is more positive than the source, it being understood that the pinchoff voltage is involved but is compensated for by the batteries B1 and B2.

When the inputs G1 and G2 are both at the low level L, the transistors Q1 through Q6 will not conduct since the gates of these transistors are more negative than the sources of the transistors. Now, if either or both of the inputs K1 and K2 are raised to the high level H, the transistors Q1 through Q6 will not conduct but the voltages on the capacitors C1 through C6 will be increased. For example, if the input K1 is raised to the high level H, all odd-numbered capacitors will develop a terminal voltage equal to 2H. This is the sum of the initially stored voltage of H and the newly induced voltage of H from the input K1. This condition is shown as Hold 1 in the mode column of FIG. 2. In a similar manner, if the input K2 is raised to the high level H and K1 remains at the low level L, all even-numbered capacitors will have a terminal voltage 2H. This condition is shown as Hold 2 in the mode column of FIG. 2. Again, in a similar manner, if both inputs K1 and K2 have the high level H applied to them, all capacitors will have a terminal voltage 2H. This condition is shown as Hold 3 in the mode column of FIG. 2.

The procedure to shift electric charge through the shift register will now be explained with reference to FIGS. 1 and 2. Again assume that the capacitors C1 through C6 have an initial voltage H on them. In Step 1, input signals G1 and K2 are at the low level L and input signals G2 and K1 are at the high level H. In this condition, voltages V1 and V3 will be 2H and voltages V2 and V4 will be H. Since G1 is low, transistors Q1 and Q3 will be cut off. Since G2 is high, transistors Q2 and Q4 will conduct if the gate is more positive than the source of the transistor. In each case, the source of the transistors Q2 and Q4 are at V2 and V4 voltages respectively, which are at the high level H. The gates of these transistors are also at the high level H. There is no voltage difference between the source and gate, disregarding the pinchoff voltage which is compensated for by the battery B2. The transistors Q2 and Q4 will not conduct. Now, the switch S1 is closed and an input charge $q1$ is drawn from the input terminal I. Since the transistor Q1 cannot conduct, the only place that this charge may come from is the capacitor C1. Thus, the charge on the capacitor C1 is reduced by the amount of charge $q1$. This will bring the voltage V1 lower than its initial value of 2H. The new value of the voltage V1 will be $2H-(q1/C1)$. This is shown in the column labeled V1 in FIG. 2. This completes Step 1.

We now go to Step 2. In Step 2 switch S1 is open. Input signals G1 and K2 to to the high level H and input signals G2 and K1 go to the low level L. Initially, in this condition the voltages V1 and V3 are reduced by the value of the high level H. This is due to the fact that the input K1 applied to one terminal of the capacitors C1 and C3 has gone back to the low level L. Thus, voltage V3 goes to the high level H. In a similar manner, the voltages V2 and V4 are increased by the high level H This is due to the fact that the input K2 has gone to the high level H. Thus, the voltage V4 goes to 2H. Also, since the input G2 is at the low level L, the even numbered transistors Q2 and Q4 will not conduct. Input G1 is at the high level H and the odd-numbered transistors Q1 and Q3 now have a positive voltage on their gate. However, the voltage V3 is at the high level H. Thus, the gate is not more positive than the source for the transistor Q3, and this transistor will not conduct.

Now the voltages V1 and V2 will be analyzed. At the end of Step 1, the voltage V1 was $2H-(q1/C1)$ and the voltage V2 was H. When we go to Step 2, the gate of the transistor Q1 will go to the high level H. The voltage V1 will be reduced to $H-(q1/C1)$, and the voltage V2 will go to 2H. In this case, the gate of the transistor Q1 being at the level H, and the source being at voltage V1, which is less than the level H, the transistor will conduct. When the transistor conducts, it operates as a source follower and charge will be transferred from the capacitor C2 to the capacitor C1 until the voltage V1 equals the high level H, at which time the transistor will be cut off. The amount of charge necessary to bring V1 back to the high level H is the quantity $q1$. Thus, the charge $q1$ is transferred from capacitor C2 to capacitor C1. The voltage V2 is now 2H minus the voltage attributable to the charge $q1$, which is $2H-(q1/C2)$. This completes Step 2.

We now go to Step 3. In Step 3, the inputs G1 and K2 go to the low level L and the inputs G2 and K1 go to the high level H. In this condition, which is similar to the conditions for Step 1, the odd-numbered voltages, that is, V1 and V3, are increased by the value H and the even-numbered voltages, that is, V2 and V4, are decreased by the value H. Thus, V4 goes to H and V3 goes to 2H. Since the input G1 is now at the low level L, the odd-numbered transistors, that is, Q1 and Q3, will not conduct. Also, since the input G2 is at the high level H, the even-numbered transistors Q2 and Q4 may conduct if the proper conditions prevail. For example, investigating transistor Q4, we see that the voltage V4, which is the source of the transistor, is also at the high level H. Thus, the gate and source are at the same voltage, disregarding the pinchoff voltage which is compensated for by battery B2, and transistor Q4 will not conduct.

Now, investigating transistor Q2, the gate will be at the level H, again disregarding the effect of the pinchoff voltage which has been compensated for by the battery B2. At the end of Step 2, the voltage V2, which is the source of transistor Q2, was at $2H-(q1/C2)$. However, when we went to Step 3, the voltage V2 was reduced by the value H. Thus, the voltage V2 went to $H-(q1/C2)$. In this case, the difference between the gate voltage and the source voltage will be sufficient to allow the transistor Q2 to conduct. Thus, transistor Q2 will conduct until the voltage V2 reaches the value H, at which time the transistor will be cut off. When the transistor Q2 conducts, any charge that is transferred must come from capacitor C3, since the transistor Q3 is cut off. The amount of charge necessary to bring V2 back to the high level H is the quantity $q1$. The charge $q1$ will be transferred from the capacitor C3 through the transistor Q2 to the capacitor C2 to bring the value of V2 up to H. Now, since a charge $q1$ was transferred from the capacitor C3, the voltage V3, which was initially at 2H, goes down to $2H-(q1/C3)$. Thus, a charge $q1$ has been transferred from capacitor C2 to capacitor C3.

Investigating capacitor C1 in Step 3, the switch S1 is again closed to allow a charge $q2$ to be drawn from the input terminal I. The initial voltage V1, which was 2H at the beginning of Step 3, will be reduced by the voltage attributable to the charge $q2$. Thus, the new value of voltage V1 at the end of Step 3 will be $2H-(q2/C1)$. This concludes Step 3.

We now go to Step 4. In Step 4, switch S1 is open. Input signals G1 and K2 go to the high level H and input signals G2 and K1 go to the low level L. Initially, in this condition the voltages V1 and V3 are reduced by the value of the high level H. This is due to the fact that the input K1 applied to one terminal of capacitors C1 and C3 has gone back to the low level L. In a similar manner, the voltages V2 and V4 are increased by the high level H. This is due to the fact that the input K2 has gone to the high level H. Also, since the input G2 is at the low level L, the even-numbered transistors Q2 and Q4 will not conduct. Input G1 is at the high level H and the odd-numbered transistors Q1 and Q3 will have a positive voltage on their gate.

The voltages V1 and V2 will now be analyzed. At the end of Step 3, the voltage V1 was $2H-(q2/C1)$ and the voltage V2 was H. When we go to Step 4, the gate of the transistor Q1 will go to the high level H. The voltage V1 will be reduced to $H-(q2/C1)$ and the voltage V2 will go to 2H. In this case, the gate of the transistor Q1 being at the level H and the source being at voltage V1, which is less than the level H. the transistor will conduct. When the transistor conducts, charge will be transferred from the capacitor C2 to the capacitor C1 until the voltage V1 equals the high level H, at which time the transistor will be cut off. The amount of charge necessary to bring V1 back to the high level H is the quantity $q2$. Thus, the charge $q2$ will be transferred from capacitor C2 to capacitor C1. The voltage V2 is now 2H minus the voltage attributable to the charge $q2$ which is $2H-(q2/C2)$.

The voltages V3 and V4 will now be analyzed. At the end of Step 3, the voltage V3 was $2H-(q1/C3)$ and the voltage V4 was H. When we go to Step 4, the gate of the transistor Q3 will go to the high level H. The voltage V3 will be reduced to $H-(q1/C3)$ and the voltage V4 will go to 2H. In this case, the gate of the transistor Q3 being at the level H and the source being at voltage V3, which is less than the level H, the transistor will conduct. When the transistor conducts, charge will be transferred from the capacitor C4 to the capacitor C3 until the voltage V3 equals the high level H, at which time the transistor will be cut off. The amount of charge necessary to bring V3 back to the high level H is the quantity $q1$. Thus, the charge $q1$ will be transferred from capacitor C4 to capacitor C3. The voltage V4 is now 2H minus the voltage attributable to the charge $q1$, which is $2H-(q1/C4)$. This concludes Step 4.

The operation of the multilevel shift register may be described in general as follows:

At each odd-numbered step a charge is transferred from each odd-numbered capacitor through the even-numbered transistors to the next lowest even-numbered capacitor, leaving the voltage on the odd-numbered capacitor reduced by the voltage attributable to the charge that has been transferred. For example, at every odd-numbered step a charge is transferred from capacitor C3 through transistor Q2 to capacitor C2, leaving the voltage on the capacitor C3 reduced by the voltage attributable to the charge that was transferred. Additionally, at every odd-numbered step, a charge is transferred from capacitor C1 to the input circuit, leaving the voltage on capacitor C1 reduced by the voltage attributable to the charge that was transferred.

At every even-numbered step, a charge is transferred from every even-numbered capacitor through the odd-numbered transistors to the next lowest odd-numbered capacitor, leaving the voltage on the even-numbered capacitors reduced by the voltage attributable to the charge that was transferred. For example, at every even-numbered step, a charge is transferred from capacitor C4 through transistor Q3 to capacitor C3, leaving the voltage on capacitor C4 reduced by the voltage attributable to the charge transferred.

The general relation for the voltages in a multiple stage shift register are given by the following equations:

(1) $$Vn = \left(2H - \frac{qk}{Cn}\right) \text{ if } \begin{matrix}(n \text{ even} \\ (p \text{ even}\end{matrix} \text{ or } \begin{matrix}(n \text{ odd} \\ (p \text{ odd}\end{matrix}$$

(2) $$Vn = H \text{ if } \begin{matrix}(n \text{ odd} \\ (p \text{ even}\end{matrix} \text{ or } \begin{matrix}(n \text{ even} \\ (p \text{ odd}\end{matrix}$$

where
$k = 1 + (p-n)/2$
$n$ = subscript on V
$p$ = step number

The output circuit shown in FIG. 1 includes essentially an additional shift register stage. The output circuit includes capacitors C5 and C6 and transistors Q5 and Q6 interconnected in a manner identical to the previous shift register stages. The drain of transistor Q6 is connected to a power supply which may be at +10 volts, for example, to provide a constant voltage for recharging the capacitor C6. The output signal is taken from one terminal of capacitor C6 through a high-impedance source follower circuit. The source follower comprises transistor Q10 and resistor R10.

As the charge is propagated through the shift register stages, it will come to the output circuit. If the steps shown in FIG. 2 are continued, Step 5 will be performed, which will be essentially identical to Steps 1 and 3. In Step 5, the inputs G1 and K2 go to the low level L and the inputs G2 and K1 go to the high level H. The charge $q1$ will be transferred from capacitor C5 through transistor Q4 to capacitor C4 in a manner identical with its transfer from capacitor C3 to capacitor C2 in Step 3. Similarly, the charge $q2$ will be transferred from capacitor C3 to capacitor C2 in a manner identical to the transfer of the charge $q1$ in Step 3. Also, in Step 5, since the switch S1 is closed, a new charge $q3$ will be transferred from capacitor C1 to the input circuit. Thus, at the conclusion of Step 5, V1 will be $2H-(q3/C1)$, V2 will be H, V3 will be $2H-(q2/C3)$, V4 will be H, V5 will be $2H-(q1/C5)$ and V6 will be H. At this step, and at all odd-numbered steps, since input G2 is high, transistor Q6 will conduct and operate as a source follower and capacitor C6 will be charged to level H from the 10-volt supply connected to transistor Q6. When capacitor C6 is charged to level H, the gate and source of transistor Q6 will be equal, neglecting the pinchoff voltage which is compensated for by battery B2, and transistor Q6 will be cut off.

We now go to Step 6. Step 6 is very similar to Steps 2 and 4. In Step 6 the charge $q1$ will be transferred from capacitor C6 to capacitor C5. Similarly, the charge $q2$ will be transferred from capacitor C4 to capacitor C3. Similarly, the charge $q3$ will be transferred from capacitor C2 to capacitor C1. At the conclusion of Step 6, V1 will be H, V2 will be $2H-(q3/C2)$, V3 will be H, V4 will be $2H-(q2/C4)$, V5 will be H, and V6 will be $2H-(q1/C6)$. At every even-numbered step, the voltage V6 will be representative of the input signal, delayed by the number of stages in the shift register. The voltage V6 is applied to the gate of transistor Q10 which will allow Q10 to conduct until the output terminal reaches the voltage V6. Transistor Q10 is operated as a voltage follower where the voltage on the source of Q10 follows the voltage on the gate of Q10.

The operation of the input circuit will now be explained. The input circuit functions at each sampling time to convert a single sample of a time-varying analog signal to an equivalent amount of electric charge. The input circuit consists of a transistor Q0 having its collector connected to the input terminal I of the shift register stages. The emitter of the transistor Q0 is connected to one side of a capacitor C0, and to the anode of a standard diode D to form a common node N1. The cathode of the diode D is connected to the base of the transistor Q0 and to a power supply which may be at −10 volts. The other side of the capacitor C0 is connected to a fixed resistor R0 and one side of a switch S1, to form a common node N2. The resistor is connected to a potentiometer R12. The analog input $V_{in}$ is applied to the capacitor through the switch S1. The switch S1 is shown symbolically as a mechanical switch. In practice, however, this may be any convenient type of electronic switch which would be gated by the appropriate clock signal.

When the switch S1 is open, the diode D will conduct and will draw electric charge from the capacitor C0. The transistor Q0 will not conduct since the base is at −10 volts, and also is more negative than the emitter. Charge will be drawn from the capacitor C0 until the node N1 reaches −10 volts. The transistor Q0 will still not conduct. The node N2 will be at the voltage set on the potentiometer R12. Now, when the switch S1 is closed, the voltage at node N2 will begin to drop in level. When it reaches 0 volts, it will have compensated for the base to emitter voltage $V_{BE}$ of the transistor Q0 and the voltage of the diode D. Any further drop will be negative and will bring the node N1 to a more negative level. When this happens, the base of the transistor Q0 will be more positive than the emitter and the transistor Q0 will conduct. Electric charge will be transferred from capacitor C1 through transistor Q0 to capacitor C0. Charge will continue to be transferred until the level of the node N1 is brought back to −10 volts minus $V_{BE}$. The amount of charge transferred will be representative of the voltage level at the input to the switch S1. At this time, the transistor Q0 will stop conducting since the base will no longer be more positive than the emitter.

We now have transferred a charge from capacitor C1 to capacitor C0. The charge that was transferred is proportional to the sampled value of the analog input signal. It can thus be seen that the input circuit will draw electric charge from the input terminal I of the shift register stages which is proportional to the analog input signal.

The initial charge on the capacitors is obtained from a completely discharged state by operating the shift register without an input signal, that is, with S1 open. Assume that all capacitors are discharged. Inputs G1 and K2 will be at the low level L and inputs G2 and K1 will be at the high level H. In this condition, the odd-numbered transistors will be cut off. Transistor Q6 will have the high level H on its gate. Since capacitor C6 is discharged, V6 is at the low level L. The gate is more positive than the source and transistor Q6 will conduct. Charge will be transferred from the +10-volt power supply connected to the drain of transistor Q6 to capacitor C6 until V6 reaches the high level H, at which time transistor Q6 will be cut off. Capacitor C6 will now have a charge on it.

G1 and K2 will now go to the high level H and G2 and K1 will go to the low level L. All even-numbered transistors will be cut off. Capacitor C5 will be discharged. Since K2 is at H, V6 will be 2H. The gate of transistor Q5 will be at H and the source of transistor Q5, V5, is at L. Thus, transistor Q5 will conduct and charge will be transferred from capacitor C6 to capacitor C5 until V5 reaches H, at which time transistor Q5 will be cut off. V5 will now be H and V6 will be H.

Now G1 and K2 go to L and G2 and K1 to to H. Since K2 has gone from H to L, V6 will be L. Transistor Q6 again conducts to charge capacitor C6 until V6 reaches H. K1 is at H so V5 goes to 2H. Transistor Q4 will conduct to transfer charge to capacitor C4 until V4 is H.

The input G1, K2 and G2, K1 again switch and the process is continued until an initial charge is on all capacitors.

Figure 3:
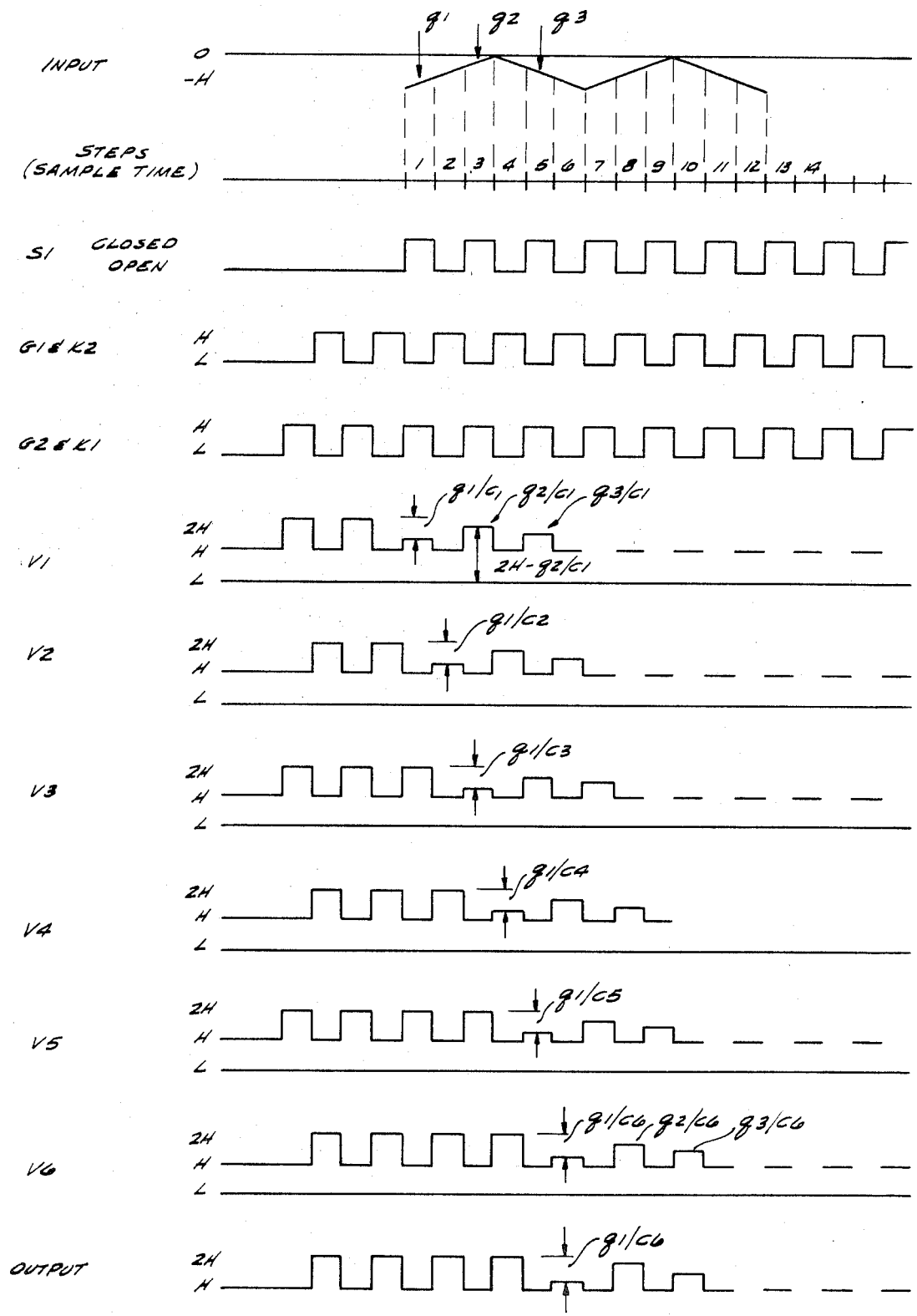
FIG. 3 is a waveform diagram showing the operation of the circuit of FIG. 1.

FIG. 3 is a waveform diagram showing the operation of the circuit of FIG. 1. An input signal is shown as the top waveform in FIG. 3. The waveform diagram shows the step-by-step voltage levels for V1 through V6 and the output which corresponds to switch S1 being opened or closed and signals G1, G2, K1 and K2 being in their appropriate states. For example, Step 1 shows G1 and K2 being at the low level L and G2 and K1 being at the high level H. In this condition, we have found that V1 will be at a level of $2H-(q1/C1)$. This is shown in the waveform diagram labeled V1. The voltage $q1/C1$ is shown as the difference between the level 2H and the actual waveform level. The waveform corresponding to the charge $q1$ can be followed through each of the diagrams V1 through V6 in a step-by-step manner. It can be seen that the voltage equivalent of the charge $q1$ will be on the output delayed two steps for each shift register stage plus two steps for the output circuit. Thus, since there are two shift register stages, there will be a delay of four steps, plus two steps for the output stage or a total delay of six steps. This can be seen from the waveform diagram of FIG. 3 with the voltage equivalent of the charge $q1$ on the output at step 6.

As is well known in the art, the sampling frequency should be at least twice the highest frequency component of the input signal in order to give sufficient resolution to get an output signal which is spectrally representative of the input signal. The sampling frequency in FIG. 3 is lower than would normally be used in practice, serving merely to illustrate the charge transfer function.

In an actual operating circuit, any convenient type of junction field effect transistor may be used to construct the circuit of FIG. 1. For example, applicants have found that a 2N 3819 transistor will work quite satisfactorily in the circuit. All capacitors in the circuit may be of the same value. The value used will depend upon the frequency of operation desired. A larger value of capacitance lowers the operating speed of the shift register. However, the capacitance must be high enough to minimize the effect of any stray capacitance in the circuit. It is sufficient that the value of the capacitors used be greater than any stray capacitance. Applicants have found that a capacitance of 33 picofarads works satisfactorily and will give a minimum frequency of operation of about 1 cycle per second. The minimum frequency is limited by the leakage of the capacitors.

In the circuit configuration and operation described above with reference to FIGS. 1, 2 and 3, electric charge is shifted from right to left and information, that is, reduction of charge, is shifted from left to right. This is shown in the MODE column of the table of FIG. 2 as Information Shift Right. It should be understood that by interchanging the input and output circuits and changing the relationship of G1, G2, K1 and K2, the charges could be made to shift right. This will be explained below.

FIG. 4 is a table of all possible combinations of inputs G1, G2, K1 and K2. Combinations 1, 2, 3 and 4 in FIG. 4 correspond to Initial Conditions, Hold 1, Hold 2 and Hold 3 modes shown in FIG. 2. Combinations 7 and 10 of FIG. 4 correspond to Steps 1-6 of FIG. 2. More particularly, combination 7 corresponds to the odd-numbered steps of FIG. 2 and combination 10 corresponds to the even-numbered steps of FIG. 2. With combination 7, G1 ad K2 are low and G2 and K1 are high. The even-numbered transistors will conduct and charge will be transferred from the odd-numbered capacitors through the even-numbered transistors to the even-numbered capacitors. With combination 10, G1 and K2 are high and G2 and K1 are low. The odd-numbered transistors will conduct and charge will be transferred from the even-numbered capacitors through the odd-numbered transistors to the odd-numbered capacitors.

Now to have charges shift right, combinations 6 and 11 of FIG. 4 would be used. This will be briefly explained with reference to FIG. 1. Assume that the input circuit and output circuit have been interchanged to provide proper terminations for the shift register stages. With combination 6, G1 and K1 are low and G2 and K2 are high. In this condition, the even-numbered transistors will conduct. The even-numbered capacitors will have a higher charge than the odd-numbered capacitors since K2 is high and K1 is low. Charge will be transferred from the even-numbered capacitors through the even-numbered transistors to the odd-numbered capacitors. With combination 11, G1 and K1 are high and G2 and K2 are low. In this condition, the odd-numbered transistors will conduct. The odd-numbered capacitors will have a higher charge than the even-numbered capacitors since K1 is high and K2 is low. Charge will be transferred from the odd-numbered capacitors through the odd-numbered transistors to the even-numbered capacitors. Thus, by interchanging the input and output circuits and providing different input to G1, G2, K1 and K2 left and right shifting through the analog shift register stages may be accomplished.

The remaining combinations shown in FIG. 4 provide various functions. Combinations 5 and 9 would intermix charges on capacitors and therefore these combinations should not be used. Combinations 8 and 12 would hold information in the shift register stages. Combinations 13 and 16 would reset the shift register stages to a fixed voltage on all capacitors. Combinations 14 and 15 would reset the shift register stages to a fixed voltage on alternate capacitors.

The table of FIG. 4 includes, in the interest of generality, all possible combinations of clock signals to the terminals G1, G2, K1 and K2. Implicit, but not obvious, is the fact that pairs of these signals are time- and amplitude-concurrent, hence may be driven from a common signal source. It may be observed, in addition, that there is no power supply in the conventional sense, power for operating the circuit being supplied through terminals G1, G2, K1 and K2.

Although the table of FIG. 4 indicates the need for pairs of clock signals, the circuit has, in fact, been operated from a single clock source by holding on pair of clock terminals at a fixed voltage level and applying a double amplitude clock to the other pair of clock terminals. Thus it may be said to be optionally operable from a single-phase clock source. For example, one pair of clock signals may be held fixed at +5 volts and the other pair of clock signals may have voltage levels of 0 volts and +10 volts.

FIG. 5 shows in block diagram form how switching of input and output circuits may be accomplished. A three-position switch S2 is placed between the input circuit and the shift register stages. Another three-position switch S3 is placed between the output circuit and the shift register stages. Switches S2 and S3 are switched at the same time. When switches S2 and S3 are in position 2, the circuit will be the same as that shown in FIG. 1. With proper inputs on G1, G2, K1 and K2, as shown by FIG. 4, charges will shift left.

With switches S2 and S3 in position 1, the input circuit and output circuit are effectively reversed. With proper inputs on G1, G2, K1 and K2, as shown by FIG. 4, charges will shift right.

An additional switch S4 is shown in FIG. 5 connecting both ends of the shift register stages together. Switch S4 would be closed only when switches S2 and S3 are in position 3 to disconnect the input circuit and output circuit. The shift register stages may have information stored in them with either left or right shifting with the input circuit and output circuit connected. The input and output circuits may then be disconnected by placing switches S2 and S3 in position 3. Switch S4 may then be closed. The information stored in the shift register stages may now be recirculated through the shift register stages with either left or right shifts by applying appropriate signals to G1, G2, K1 and Kz. The information may be removed from the shift register stages by opening switch S4 and reconnecting the input and output circuits with switches S2 and S3 and then providing a left or right shift as desired with appropriate signals on G1, G2, K1 and K2.

It should be understood that while switches S2, S3, and S4 are shown symbolically in FIG. 5 as mechanical switches, the switching may be accomplished by any convenient means. For example, the switching may be accomplished with conventional logic circuitry using AND and OR gates.

Junction field effect transistors were used in the preceding descriptions of the invention. It should be understood that MOS field effect transistors (MOSFETs) may be used to construct the shift register stages of the invention. The only adjustment that may be necessary would be a reversal of voltage levels, depending upon whether a P-type or N-type MOSFET was used. This voltage reversal is well known in the transistor art. The basic shift register described above may be expanded to perform various other functions. These will be described below using MOSFETs instead of junction FETs for the shift register stages. To further aid in the ease of explanation, the input circuit and output circuit and appropriate switching as shown in FIG 5 will not be shown in the Figures described below. The input circuit and output circuit would be similar to those shown in FIG. 1.

FIG. 6 shows an analog shift register used as a commutator. The shift register includes a series of MOSFETs 21–26. The gates of the odd-numbered MOSFETs are connected to input terminal G1. The gates of the even-numbered MOSFETs are connected to input terminal G2. The shift register further includes a series of capacitors 31–36. The transistors and capacitors in FIG. 6 are interconnected in a manner identical to the transistors and capacitors of the shift register stages in FIG. 1. The only difference is that MOSFETs have been substituted for junction FETs. The shift register shown in FIG. 6 will operate in the same manner as the shift register shown in FIG. 1. There is an additional series of gating MOSFETs 41, 42 and 43, each having its gate connected to one of the analog shift register stages. One of the signal terminals of each of the gating MOSFETs 41, 42 and 43 is connected together to form a commutated output. The other signal terminal of the gating MOSFETs 41, 42 and 43 are connected to signal inputs. Now, if a single charge is shifted through the analog shift register, it will come to capacitor 32. The voltage provided by the charge on capacitor 32 is applied to the gate of MOSFET 41. The charge is adjusted to provide a voltage which is sufficient to allow MOSFET 41 to conduct. The input applied to MOSFET 41 will then be gated to the commutated output. As the charge continues to shift through the shift register stages, it will come to capacitor 34. In a similar manner, the voltage will be applied to the gate of MOSFET 42 and will allow the input to MOSFET 42 to be gated to the commutated output. Similarly, the input applied to MOSFET 43 will be gated to the commutated output. It should be understood that the commutator circuit shown in FIG. 6 is not limited to three analog inputs, but could be expanded for any number of analog inputs required with the addition of one gating MOSFET and one shift register stage for each input. It should be further understood that the inputs to the gating MOSFETs 41, 42 and 43 may be either digital signals or analog signals provided by appropriate circuitry.

A further use of the analog shift register is as a parallel input serial output circuit as shown in FIG. 7. The circuit of FIG. 7 again includes a series of analog shift register stages. The circuit further includes a series of gating MOSFETs 51–55 used to gate inputs to various stages of the shift register. For example, MOSFET 51 is connected to capacitor 32. Similarly, MOSFET 53 is connected to capacitor 34. MOSFET 52 is connected to capacitor 33. MOSFET 54 is connected to capacitor 35. Since each stage of the shift register is composed of two capacitors and two transistors, it is convenient to allow two different sets of inputs to be connected to the shift register stages. For example, when the odd-numbered transistors 51, 53 a 55 are allowed to conduct by having an appropriate signal put on the SET 1 terminal, the signals on the inputs corresponding to these gating MOSFETs will be transferred to the even numbered capacitors in the shift register stages. Similarly, when the even-numbered MOSFETs 52 and 54 are allowed to conduct by having an appropriate signal on the SET 2 terminal, the corresponding inputs will be transferred to the odd-numbered capacitors in the shift register stages.

The inputs may be either digital or analog. If the inputs are digital, they may be either hardwired to appropriate voltage levels, or connected through any convenient type of switching arrangement. If the inputs are analog signals, they would be provided by any convenient type of input circuit that would allow a charge transfer from the corresponding capacitor in the shift register stages. These circuits may be similar to the input circuits used for the analog shift register stages. Once the information is placed into the shift register stages, it may be shifted either left or right to provide a serial output from the analog shift register stages. It should be understood that the circuit shown in FIG. 7 is not limited to the number of inputs shown. Any number of inputs could be provided with the addition of shift register stages and gating MOSFETs.

Figure 8:
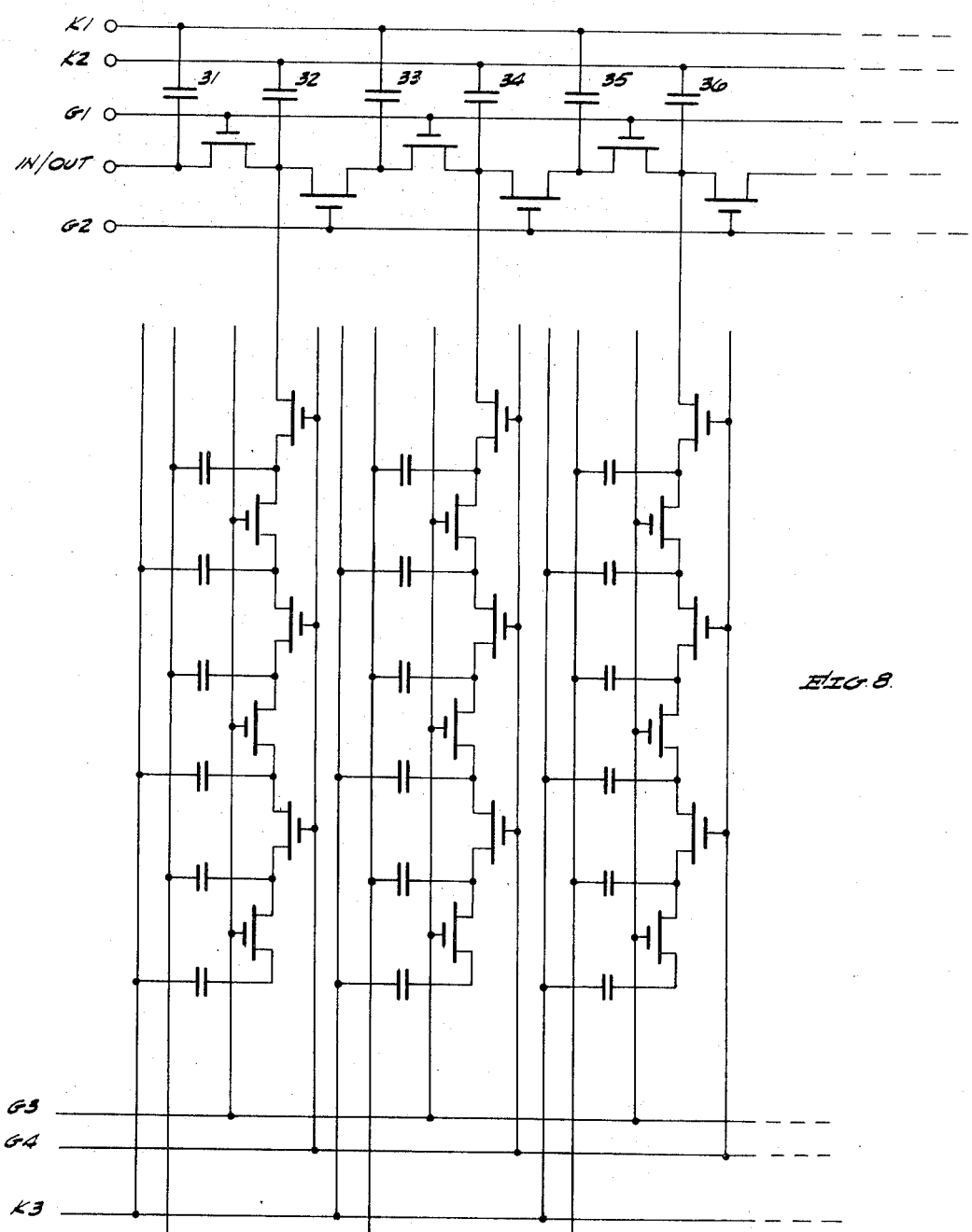
FIG. 8 shows a left-right/up-down analog shift register.

FIG. 8 shows a combination of a left/right shift register with a plurality of up/down shift registers. The up/down shift registers are identical to the left/right shift register. The input/output terminal of each of the up/down shift registers is connected to one stage of the left/right shift register. This circuit may be used to shift information left or right in the left/right shift register in a serial manner and then shift up or down in either a serial or a parallel manner with the up/down shift registers. For example, information may be shifted into the left/right shift register from the left end in a serial manner. The information may then be shifted into any of the up/down shift registers in a serial manner. To accomplish this, assume that information is shifted to capacitor 32 in the left/right shift register. At this point, the information will be transferred to the first up/down shift register which is connected to capacitor 32. More information is then shifted into the left/right shift register until it reaches capacitor 32. It may then again be shifted into the first up/down shift register. In this way, information is shifted serially in the left/right shift register and serially into the up/down shift register. In a similar manner, information may be shifted serially into the second or third up/down shift registers.

Information may also be shifted in a serial manner into the left/right shift register until the register is full. The information may then be transferred into the up/down shift registers in a parallel manner. To accomplish this, the information will be shifted into the left/right shift register until the register is completely full. Then all of the up/down shift registers will be enabled to transfer the information to the first stage of each of the up/down shift registers. New information will then be shifted into the left/right shift register and once again, all up/down shift registers will be enabled to transfer the information in parallel into the up/down shift registers. It should be understood that the circuit shown in FIG. 8 is not limited to the number of stages shown. It could be expanded to any number of stages desired.

Figure 9:
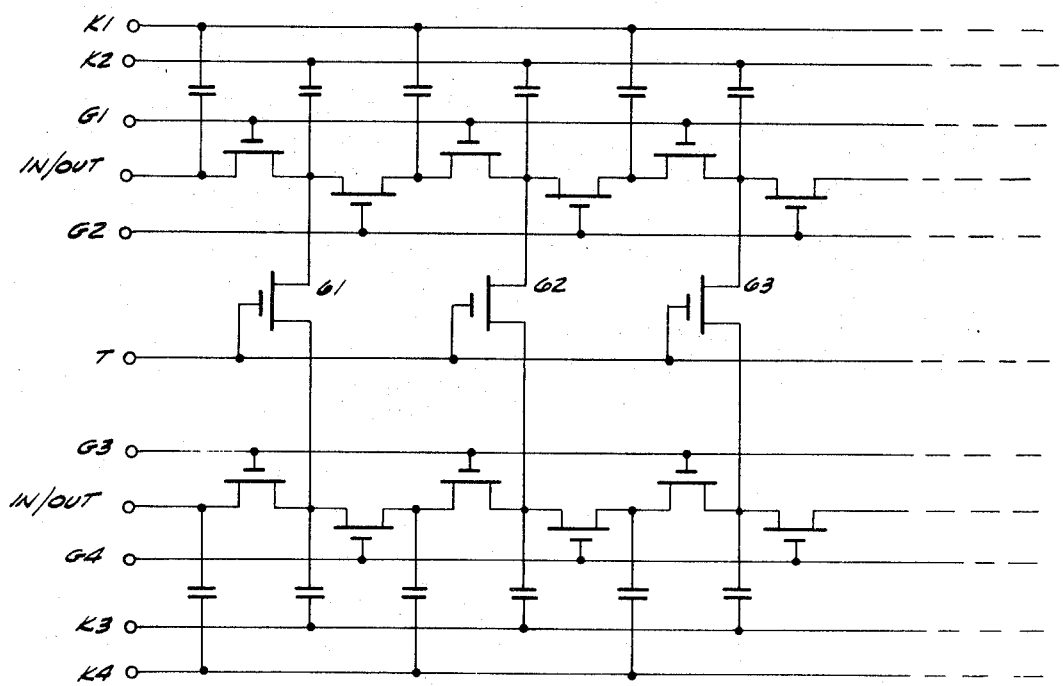
FIG. 9 shows the analog shift register used for signal averaging.

FIG. 9 shows two shift registers used together to perform signal averaging. This circuit can be used as a noise or clutter reject filter. The circuit is used for improving signal-to-noise ratio of a signal which is very deep in noise but where the signal is repetitive. The circuit operates on the principle that the average value of the noise is zero, but the signal is additive. The top shift register will have capacitors which are very large relative to the capacitors used in the lower shift register. For example, the ratio of capacitor values may be 100:1. The incoming signal with the noise is shifted into the lower shift register with the small capacitors. The charges in the lower shift register are then transferred to the upper shift register by enabling the transfer MOSFETs 61, 62 and 63 by applying an appropriate signal to terminal T. The signal is again shifted into the lower shift register and transferred to the upper shift register. This is repeated many times. After many repetitions, the capacitors of the upper shift register will contain charges representative of the original input signal. The noise which has an average value of zero will have been filtered out, but the original input signal, which is additive, will build up the charge on the large capacitors of the upper shift register. The information may then be shifted out of the upper shift register as desired.

What is claimed is:

1. A circuit comprising:
    a shift register having a plurality of interconnected stages and having a first end and a second end;
    each of said plurality of stages storing information as the absence of a quantity of electric charge on a capacitor and being responsive to a first combination of clock pulse signals to shift information from the first end of said shift register to the second end of said shift register and being responsive to a second combination of clock pulse signals to shift information from the second end of said shift register to the first end of said shift register;
    switching means coupled to the first and second ends of said shift register;
    input means coupled to said switching means for providing a quantity of electric charge proportional to a sampled input signal;
    output means coupled to said switching means for providing a voltage signal proportional to a quantity of electric charge;
    said switching means having a first condition whereby said input means is coupled to the first end of said shift register and said output means is coupled to the second end of said shift register to provide information shifting from said input means through said plurality of stages to said output means in response to the first combination of clock pulse signals;
    said switching means having a second condition whereby said input means is coupled to the second end of said shift register and said output means is coupled to the first end of said shift register to provide information shifting from said input means through said plurality of stages to said output means in response to the second combination of clock pulse signals; and
    said switching means having a third condition whereby the first and second ends of said shift register are coupled together to provide information recirculation through said plurality of stages in response to either the first or the second combinations of clock pulse signals.

2. A shift register that stores information as the absence of a quantity of electric charge on a capacitor and that has a first end and a second end, said shift register circuit comprising:
    a first plurality of transistors, each having a first signal terminal, a second signal terminal, and a control terminal, each of the control terminals being coupled to receive a first clock pulse signal having first and second voltage levels;
    a second plurality of transistors, each having a first signal terminal, a second signal terminal, and a control terminal, all but one of the first signal terminals being individually coupled to the first signal terminal of an individual one of said first plurality of transistors, each of the second signal terminals being individually coupled to the second signal terminal of another individual one of said first plurality of transistors, each of the control terminals being coupled to receive a second clock pulse signal having first and second voltage levels;
    a first plurality of capacitors, each having a first terminal coupled to the first signal terminal of an individual one of said first plurality of transistors, and a second terminal being coupled to receive a third clock pulse signal having first and second voltage levels;
    a second plurality of capacitors, each having a first terminal coupled to the second signal terminal of an individual one of said first plurality of transistors, and a second terminal being coupled to receive a fourth clock pulse signal having first and second voltage levels;
    the first end of the shift register circuit being the one of the first signal terminals of said first plurality of transistors not coupled to a signal terminal of said second plurality of transistors;
    the second end of the shift register circuit being the one of the first signal terminals of said second plurality of transistors not coupled to a signal terminal of said first plurality of transistors;
    whereby electric charge is transferred from said first plurality of capacitors through the signal terminals of said second plurality of transistors to said second plurality of capacitors and electric charge is transferred from said second plurality of capacitors through the signal terminals of said first plurality of transistors to said first plurality of capacitors when the first and fourth clock pulse signals are the same, and the second and third clock pulse signals are the same; and
    whereby electric charge is transferred from said first plurality of capacitors through the signal terminals of said first plurality of transistors to said second plurality of capacitors and electric charge is transferred from said second plurality of capacitors through the signal terminals of said second plurality of transistors to said first plurality of capacitors when the first and third clock pulse signals are the same and the second and fourth clock pulse signals are the same.

3. A circuit as claimed in claim 2 which further includes:
    switching means coupled to the first and second ends of said shift register;
    input means coupled to said switching means for providing a quantity of electric charge proportional to a sampled input signal;
    output means coupled to said switching means for providing a voltage signal proportional to a quantity of electric charge;
    said switching means having a first condition whereby said input means is coupled to the first end of said shift register and said output means is coupled to the second end of said shift register to provide information shifting from said input means through said plurality of transistors to said output means when the first and fourth clock pulse signals are the same and the second and third clock pulse signals are the same;

said switching means having a second condition whereby said input means is coupled to the second end of said shift register and said output means is coupled to the first end of said shift register to provide information shifting from said input means through said plurality of transistors to said output means when the first and third clock pulse signals are the same and the second and fourth clock pulse signals are the same;

said switching means having a third condition whereby the first and second ends of said shift register are coupled together to provide information recirculation through said plurality of transistors in one direction when the first and fourth clock pulse signals are the same and the second and third clock pulse signals are the same and in the opposite direction when the first and third clock pulse signals are the same and the second and fourth clock pulse signals are the same.

4. A circuit as claimed in claim 2 which further includes:

a plurality of gating transistors, each having a control terminal coupled to an individual one of the second signal terminals of said plurality of transistors each having a first signal terminal coupled to a common output, each having a second signal terminal coupled to receive an individual input signal;

each individual input signal being successively gated through the signal terminals of its associated gating transistor to the common output as electric charge is shifted successively through each of said plurality of transistors and applied to the control terminal of its associated gating transistor.

5. A circuit as claimed in claim 2 which further includes:

a plurality of gating transistors, each having a control terminal coupled to receive a control input, each having a first signal terminal coupled to an individual one of the second signal terminals of said plurality of transistors, each having a second signal terminal coupled to receive an individual input signal;

each individual input signal being gated through the signal terminals of its associated gating transistor to its associated one of said plurality of transistors in response to the control input.

6. An analog shift register comprising:

a first plurality of field effect transistors, each having a first signal terminal, a second signal terminal, and a gate terminal, each of the gate terminals being coupled to receive a first clock pulse signal having high and low voltage levels;

a second plurality of field effect transistors, each having a first signal terminal, a second signal terminal, and a gate terminal, all but one of the first signal terminals being individually coupled to the first signal terminal of an individual one of said first plurality of field effect transistors, each of the second signal terminals being individually coupled to the second signal terminal of another individual one of said first plurality of field effect transistors, each of the gate terminals being coupled to receive a second clock pulse signal having high and low voltage levels;

a first plurality of capacitors, each having a first terminal coupled to the first signal terminal of an individual one of said first plurality of field effect transistors, and a second terminal being coupled to receive a third clock pulse signal having high and low voltage levels;

a second plurality of capacitors each having a first terminal coupled to the second signal terminal of an individual one of said first plurality of field effect transistors, and a second terminal being coupled to receive a fourth clock pulse signal having high and low voltage levels;

whereby electric charge is transferred from said first plurality of capacitors through the signal terminals of said second plurality of field effect transistors to said second plurality of capacitors when the first and fourth clock pulse signals are the same and at their low voltage levels and when the second and third clock pulse signals are the same and at their high voltage levels, and electric charge is transferred from said second plurality of capacitors through the signal terminals of said first plurality of field effect transistors to said first plurality of capacitors when the first and fourth clock pulse signals are the same and at their high voltage levels and when the second and third clock pulse signals are the same and at their low voltage levels; and whereby electric charge is transferred from said first plurality of capacitors through the signal terminals of said first plurality of field effect transistors to said second plurality of capacitors when the first and third clock pulse signals are the same and at their high voltage levels and when the second and fourth clock pulse signals are the same and at their low voltage levels, and electric charge is transferred from said second plurality of capacitors through the signal terminals of said second plurality of field effect transistors to said first plurality of capacitors when the first and third clock pulse signals are the same and at their low voltage levels and when the second and fourth clock pulse signals are the same and at their high voltage levels.

7. An analog shift register comprising:

a first plurality of field effect transistors, each having a first signal terminal, a second signal terminal, and a gate terminal, each of the gate terminals being coupled to receive a first clock pulse signal having high and low voltage levels;

a second plurality of field effect transistors, each having a first signal terminal, a second signal terminal, and a gate terminal, all but one of the first signal terminals being individually coupled to the first signal terminal of an individual one of said first plurality of field effect transistors, each of the second signal terminals being individually coupled to the second signal terminal of another individual one of said first plurality of field effect transistors, each of the gate terminals being coupled to receive a second clock pulse signal having high and low voltage levels;

a first plurality of capacitors, each having a first terminal coupled to the first signal terminal of an individual one of said first plurality of field effect transistors, and a second terminal being coupled to receive a third clock pulse signal having high and low voltage levels;

a second plurality of capacitors each having a first terminal coupled to the second signal terminal of an individual one of said first plurality of field effect transistors, and a second terminal being coupled to receive a fourth clock pulse signal having high and low voltage levels;

whereby electric charge is transferred from said first plurality of capacitors through the signal terminals of said second plurality of field effect transistors to said second plurality of capacitors when the first and fourth clock pulse signals are the same and at their high voltage levels and when the second and third clock pulse signals are the same and at their low voltage levels, and electric charge is transferred from said second plurality of capacitors through the signal terminals of said first plurality of field effect transistors to said first plurality of capacitors when the first and fourth clock pulse signals are the same and at their low voltage levels and when the second and third clock pulse signals are the same and at their high voltage levels; and whereby electric charge is transferred from said first plurality of capacitors through the signal terminals of said first plurality of field effect transistors to said second plurality of capacitors when the first and third clock pulse signals are the same and at their low voltage levels and when the second and fourth clock pulse signals are the same and at their high voltage levels, and electric charge is transferred from said second plurality of capacitors through the signal terminals of said second plurality of field effect transistors to said first plurality of capacitors when the first and third clock pulse signals are the same and at their high voltage levels and when the second and fourth clock pulse signals are the same and at their low voltage levels.

* * * * *